United States Patent Office 3,007,884
Patented Nov. 7, 1961

3,007,884
CELLULAR POLYURETHANE RESIN CONTAINING PRIMARY-2-HYDROXYETHYLPHOSPHATE AND METHOD OF PREPARING SAME
Melvin Kaplan, Tonawanda, and Marvin Koral, Buffalo, N.Y., assignors to Allied Chemical Corporation, New York, N.Y., a corporation of New York
No Drawing. Filed June 10, 1959, Ser. No. 819,243
5 Claims. (Cl. 260—2.5)

This invention relates to polyurethanes and more particularly is directed to new and improved fire retardant polyurethane copolymers and methods for preparing them.

Polyurethane resin masses are well known in the plastic art. The rigid cellular or foamed resins derived from organic polyisocyanates are expanding in application particularly in the field of insulating materials. Such polymers due largely to their excellent thermal insulating character find increasing application in the construction of refrigerators, truck panels, acoustical tile, radomes and other airplane parts and in the building field. In many of these important areas it is required that the insulating material be fire retardant.

It is known to impart fire retardant properties by addition to the copolymerizable mass of adjuvants such as organic phosphorus compounds, e.g. tris(2-chloroethyl) phosphate, dialkyl phenyl phosphonate and inorganic compounds, e.g. ammonium phosphate, antimony oxides. These materials of course vary in their efficacy and generally the effect obtained is directly proportional to the amount used. These agents do not react with the polymer and not only is the effect induced fugitive but also their presence in the resin mass leads to a deterioration of the physical properties of the copolymer, such as dimensional stability, compression strength, density and the like. Fire retardant polyurethanes have also been prepared by using halogenated polyesters as a component of the copolymer. However, these structures are difficult to handle and are relatively expensive. Thus while fire retardant polyurethane resin masses are generally known in the art, these compositions leave much to be desired. Accordingly it is an object of this invention to provide polyurethane resin masses characterized by a high degree of fire retardancy, good dimensional stability, low density and high compression strength.

Another object is to provide economical and commercially feasible methods of obtaining fire retardant rigid polyurethane resin masses having improved properties.

These and other objects of the present invention will be obvious from the following description.

In accordance with the present invention an organic polyisocyanate is caused to react with an active hydrogen-containing substance such as a polyoxy alkylene glycol or polyester or polyesteramide and primary-2- hydroxyethylphosphite in the presence of a blowing agent such as water or a fluorinated aliphatic saturated hydrocarbon. The resulting mixture produces a cellular product having a majority of closed cells filled with gas genereated by the blowing agent. The polymerized product is fire retardant, of good dimensional stability and high compression strength.

It has been found that the primary-2-hydroxy-ethylphosphite reacts with organic polyisocyanates to produce copolymers which are characterized by a high degree of fire retardancy and do not cause deterioration of the physical properties of the copolymer such as dimensional stability, compression strength, density and the like. A method of preparation of the primary-2-hydroxyethylphosphite is described in co-filed application Serial No. 819,237, now Patent No. 2,974,159. The amount of primary-2-hydroxyethylphosphite which can be used can be varied over a broad range, amounts of 1% of the total weight of the resin mass have been found to impart fire retardancy. We prefer to use between about 5 and 25% of the resin mass and especially 10 to 12%.

Any organic polyisocyanate will be suitable in the preparation of the resins of this invention. Examples of these include:

2,4-tolylene diisocyanate 2,6-tolylene diisocyanate

Mixture of 2,4 and 2,6-tolylene diisocyanates:

m-Phenylene diisocyanate
Naphthalene-1,5-diisocyanate
Diphenylmethane-4,4'-diisocyanate and various mixtures of these.

Prepolymers of the polyisocyanates with various glycols are suitable and in most instances are to be preferred. Prepolymers, as is well known, are formed by condensing an active hydrogen-containing substance such as a glycol with a polyisocyanate, with one or the other component in excess. Subsequently the prepolymer is caused to react with the balance of the component not used in excess so that the resulting copolymer is substantially completely free of reactive groups. In the present instance it is preferred to use a prepolymer containing an excess of isocyanate groups. Such prepolymer is that obtainable by coreacting 100 parts of a mixture of 80 parts of 2,4-toluene diisocyanate and 20 parts of 2,6-toluene diisocyanate with 10 parts of hexanetriol.

The polyisocyanate component is caused to react with a mixture of primary-2-hydroxyethylphosphite and another active hydrogen-containing substance. Such other active hydrogen-containing substances which can be used are well known to those skilled in this are and include polyoxyalkylene ethers such as condensation products of ethylene and/or propylene oxide with polyols such as propylene glycol, trimethylol propane, hexanetriol, glycerin and the like; polyesters such as the reaction product of adipic acid and polyols such as propylene glycol and trimethylol propane, and the analogously produced polyesters and polyesteramides prepared from such polybasic acids as sebacic, phthalic, succinic fumaric, itaconic, malonic, etc., with a polyol or polyamine in a manner well known to those skilled in this art; hydroxylated vegetable oils such as castor oil, can often be used with advantage.

In a preferred mode of carrying out the preparation of the improved fire retardant resins of this invention a mixture of a polyester prepared from adipic acid and trimethylol propane having an acid number of 15 to 20, a hydroxyl number of 465 to 495, a Brookfield viscosity of 70,000 to 80,000 cps. (measured at 25° C.) and a water content of 0.1 to 0.4%, 2-hydroxyethylphosphite and a small proportion of a non-ionic wetting agent is prepared as a premix and to this is added a mixture of a fluorinated hydrocarbon blowing agent and a diisocyanate prepolymer. The mass is agitated rapidly for about thirty seconds and then poured into a mold in which the foaming mass expands and sets within about five minutes. The resulting acid catalyzed resin system can be cured by standing at room temperature for several hours to several days or it can be heated in an oven at about 50° to about 70° C. for several hours.

Alternatively, if desired to use an alkaline catalyst and water as the blowing agent, these reagents are admixed with the premix prior to the addition of the isocyanate component.

The following examples will illustrate the features of the present invention. Parts are by weight and temperatures are given in degrees centigrade.

Example 1

A premix consisting of 100 parts of an adipic acid (10 mols), trimethylol propane (16 mols), polyester having an acid number of 15 to 20, 1 part of "Tween 21" (a product of Rohm & Haas being polyoxyethylene sorbitan monolaurate), 1 part of N-methylmorpholine and 4 parts of water, was prepared. To 85 parts of the premix, 20 parts primary-2-hydroxyethylphosphite were added and the mass was mixed thoroughly. To the resulting mixture, 164 parts of a prepolymer prepared from 10 parts of hexanetriol and 100 parts of "Nacconate 80" (80%) 2,4- and 20%-toluene diisocyanates) was added and the resulting mass was agitated vigorously for thirty seconds before pouring it into a suitable mold. The foamed product was cured at ambient temperature for one week. After curing the resultant foam was tested for fire retardancy according to the test described below and the results compared with similarly prepared foam containing "Celluflex CEF" (tris(2 - chloroethyl)phosphate, a product of Celanese Corporation) a commercially available fire retardant agent.

The fire retardance of the polyurethane foam composition was determined by a modification of the standard test method ASTM D–757–49. The test piece measured 14 in. x 2 in. x ¼ in. and was suspended above the "Globar" with the bottom edge of the foam piece in contact therewith. The test piece was supported in a metal template which exposed a 12 in. x 1 in. section in addition to the 1 in. lower end. Contact of the foam was made when the "Globar" was heated to the predetermined temperature. The time, in seconds, the piece continued to burn was rated as the "burning time." The average of at least two such tests was taken as the "average burning time."

The foam prepared as described above had an average burning time of 7.5 seconds whereas the "Celluflex" containing foam continued to burn for twenty-four seconds.

Preparation of Celluflex foam—formulation of premix:

| | Parts |
|---|---|
| Polyester | 100 |
| "Celluflex CEF" | 50 |
| Water | 10 |
| Tetrahydroxyethyl-ethylene diamine | 2.0 |
| "Emulphor EL–719" [1] | 1.0 |
| "Witco 77–86" [2] | 0.5 |
| N-methylmorpholine | 1.0 |

[1] Polyoxyethylated vegetable oil, a non-ionic emulsifier, product of Antara.
[2] A non-ionic emulsifier, product of Witco Chemical Co., a mixture of non-ionic and anionic agents which is a blend of polyalcohol carboxylic acid esters and oil-soluble sulfonates.

This premix is reacted with 275 parts of the prepolymer used in the foamed product and in the same manner described above.

Example 2

To a premix consisting of 100 parts PFR–6 polyester (adipic acid-trimethylol propane based polyester)
0.5 part "Silicone X–521" siloxane-oxyalkylene block copolymers of U.S. Patent 2,834,748 (Union Carbide & Carbon)
25 parts primary-2-hydroxyethylphosphite A mixture of 130 parts of "Nacconate 1080H" and 25 parts of "Genetron 11," trichloromonofluoromethane, is added. The mass was agitated for thirty seconds and then poured into a mold wherein it was permitted to foam for about five minutes. This product was cured at ambient temperature for one week and then tested for fire retardancy.

The product burned for 13.2 seconds and was self-extinguishing (average of two tests). Ignition temperature was 1650° F.

Example 3

In order to demonstrate the superiority of 2-hydroxyethylphosphite as a fire retardant agent over known agents, a direct comparison of two produced foams was made. The formulation of these two foams was as follows:

| | A, parts | B, parts |
|---|---|---|
| PFR–6 | 100 | 100 |
| "Silicone X–521" | 1 | 1 |
| 2-hydroxyethylphosphite | 30 | 0 |
| "Celluflex CEF" | 0 | 30 |
| N-methylmorpholine | 0 | 1 |
| "Nacconate 1080H" [1] | 108 | 108 |
| "Genetron 11" | 25 | 25 |

[1] Prepolymer obtained by reaction of 10 parts of hexanetriol with 100 parts "Nacconate 80."

It will be noted that foam A is an acid catalyzed product while B foam B is base catalyzed.

| Physical Properties | A | B |
|---|---|---|
| Density, lbs./cu. ft. | 1.7 | 2.9 |
| Fire Retardance | 12 seconds [1] | 40 seconds [2] |
| Heat Source | 1,675° F. | 1,675° F. |

[1] Self-extinguishing.
[2] Consumed entirely.

The preparation of the rigid polyurethane masses is well known in the art and is described in many patents. The formulation of these masses from a variety of polyols, polyesters, polyamides and other active hydrogen containing substances, and the use therein of dispersing agents, cross-linking agents, catalysts, stabilizers and the like adjuvants are conventional in this art and no detailed discussion of these collateral aspects is believed necessary. Our invention involves the addition of primary-2-hydroxyethylphosphite, an active hydrogen-containing fire retardant agent to the copolymerizable polyurethane mass, which agents is capable of reacting with the other polymerizable components and hence being chemically bound thereby. As a result of this chemical fixing of the fire retardant component, a high degree of permanency results. Further, the acidic nature of the phosphate monoester permits the resin masses prepared therefrom to copolymerize without the addition of the more conventional basic and/or amine catalysts. It is preferable when utilizing the fluorohydrocarbons as blowing agents, to omit these basic catalysts since we have found that the foams produced in that manner are less susceptible to shrinkage and flaws.

We claim:
1. In a process for the production of fire retardant cellular polyurethane resin masses formed by reacting an organic polyisocyanate and an active hydrogen-containing substance reactive to the organic polyisocyanate in the presence of a blowing agent, the improvement which comprises adding primary - 2 - hydroxyethylphosphite as a reactant to the copolymerizing mixture in an amount of at least 1% by weight of the mixture.

2. In a process for the production of fire retardant cellular polyurethane resin masses formed by reacting an organic polyisocyanate and an active hydrogen-containing substance reactive to the organic polyisocyanate in the presence of a blowing agent, the improvement which comprises adding primary-2-hydroxyethylphosphite as a reactant to the reaction mixture in an amount of between about 5–25% by weight of the mixture.

3. In a process for the production of fire retardant cellular polyurethane resin masses formed by reacting an organic polyisocyanate and an active hydrogen-containing substance reactive to the organic polyisocyanate in the presence of a fluorohydrocarbon blowing agent, the improvement which comprises adding primary-2-hydroxyethylphosphite as a reactant to the reaction mixture in an amount of at least 1% by weight of the mixture.

4. A fire retardant cellular polyurethane resin mass formed by reacting an organic polyisocyanate, an active hydrogen-containing substance reactive to the organic polyisocyanate and at least 1% primary-2-hydroxyethylphosphite by weight of the resin mass in the presence of a blowing agent.

5. A fire retardant cellular polyurethane resin mass formed by reacting an organic polyisocyanate, an active hydrogen-containing substance reactive to the organic polyisocyanate and 5–25% primary-2-hydroxyethylphosphite by weight of the resin mass in the presence of trichloromonofluoromethane blowing agent.

References Cited in the file of this patent

UNITED STATES PATENTS 2,915,496     Swart et al. _____ Dec. 1, 1959

FOREIGN PATENTS 1,161,239     France _____ Mar. 17, 1958

UNITED STATES PATENT OFFICE
CERTIFICATE OF CORRECTION

Patent No. 3,007,884                  November 7, 1961

Melvin Kaplan et al.

It is hereby certified that error appears in the above numbered patent requiring correction and that the said Letters Patent should read as corrected below.

Column 3, line 5, for "Rohm & Haas" read -- Atlas Chemical Industries, Inc. --.

Signed and sealed this 1st day of May 1962.

(SEAL)
Attest:

ERNEST W. SWIDER
Attesting Officer

DAVID L. LADD
Commissioner of Patents